United States Patent
Morin

(10) Patent No.: US 10,186,982 B2
(45) Date of Patent: Jan. 22, 2019

(54) DUAL-INPUT SINGLE-OUTPUT POWER SUPPLY

(71) Applicant: TELCODIUM INC., Boucherville (CA)

(72) Inventor: Eric Morin, Longueuil (CA)

(73) Assignee: TELCODIUM INC., Boucherville (CA)

(*) Notice: Subject to any disclaimer, the term of this patent is extended or adjusted under 35 U.S.C. 154(b) by 0 days.

(21) Appl. No.: 15/563,725

(22) PCT Filed: Apr. 1, 2016

(86) PCT No.: PCT/CA2016/050380
§ 371 (c)(1),
(2) Date: Oct. 2, 2017

(87) PCT Pub. No.: WO2016/154759
PCT Pub. Date: Oct. 6, 2016

(65) Prior Publication Data
US 2018/0076731 A1    Mar. 15, 2018

Related U.S. Application Data

(60) Provisional application No. 62/142,060, filed on Apr. 2, 2015.

(51) Int. Cl.
| | |
|---|---|
| *H02M 7/217* | (2006.01) |
| *H02M 1/10* | (2006.01) |
| *G06F 1/26* | (2006.01) |
| *H02J 9/06* | (2006.01) |
| *H02M 3/157* | (2006.01) |
| *H02M 3/158* | (2006.01) |

(Continued)

(52) U.S. Cl.
CPC .......... *H02M 7/2176* (2013.01); *G06F 1/263* (2013.01); *H02J 9/061* (2013.01); *H02M 1/10* (2013.01); *H02M 3/157* (2013.01); *H02M 3/1584* (2013.01); *H02M 3/33561* (2013.01); *H02M 3/33569* (2013.01); *H02M 2001/325* (2013.01)

(58) Field of Classification Search
CPC ........ H02M 1/10; H02M 3/157; H02M 3/158; H02M 3/1584; H02M 3/33561; H02M 3/33569; H02M 7/217; H02M 7/2176; H02J 3/005; H02J 9/06; G06F 1/26; G06F 1/263
See application file for complete search history.

(56) References Cited

U.S. PATENT DOCUMENTS

| | | |
|---|---|---|
| 5,587,895 A | 12/1996 | Harkins |
| 6,150,803 A | 11/2000 | Varga |
| 6,643,158 B2 | 11/2003 | McDonald et al. |

(Continued)

OTHER PUBLICATIONS

International Search Report, 9 pages, dated Jun. 20, 2016, Application No. PCT/CA2016/050380.

*Primary Examiner* — Matthew Nguyen
(74) *Attorney, Agent, or Firm* — Norton Rose Fulbright Canada LLP

(57) ABSTRACT

There is described a dual-input single-output power supply with shared circuitry for the rectifying and power conversion stages and duplicated circuitry for the filtering and protection stages, and with a switching device to switch between the two inputs. Operation of the switching device is controlled according to the status of the input power feeds.

20 Claims, 11 Drawing Sheets

(51) Int. Cl.
*H02M 3/335* (2006.01)
*H02M 1/32* (2007.01)

(56) References Cited

U.S. PATENT DOCUMENTS

| | | | |
|---|---|---|---|
| 6,650,560 B2 | 11/2003 | MacDonald et al. | |
| 6,707,170 B2 * | 3/2004 | Fukaya | H02J 7/1423 290/40 A |
| 6,720,675 B2 * | 4/2004 | Azuma | H02J 7/022 307/82 |
| 7,446,431 B2 | 11/2008 | Chiu | |
| 7,548,441 B2 | 6/2009 | Vinciarelli | |
| 8,026,698 B2 | 9/2011 | Scheucher | |
| 8,310,100 B2 | 11/2012 | Humphrey et al. | |
| 8,462,527 B1 | 6/2013 | Vinciarelli | |
| 2003/0197425 A1 | 10/2003 | Montante | |
| 2006/0028069 A1 * | 2/2006 | Loucks | H02J 3/005 307/130 |
| 2009/0174261 A1 * | 7/2009 | Kuo | H02J 3/005 307/80 |
| 2013/0020872 A1 | 1/2013 | Kinnard | |
| 2014/0054968 A1 | 2/2014 | Szu | |
| 2017/0271998 A1 * | 9/2017 | Ichihara | H02M 5/458 |

* cited by examiner

TABLE 1: Sample time

| Error | Switch time |
|---|---|
| Low voltage | Switch to other source after 36ms |
| Low low voltage | Switch to other source after 20ms |
| No voltage | Switch to other source after 4ms |

TABLE 2: 120V Threshold

| Voltage setting | Low voltage threshold |
|---|---|
| Wide | 95 volts[1] |
| Medium | 100 volts |
| Narrow | 105 volts |

TABLE 3: 240V Threshold

| Voltage setting | Low voltage threshold |
|---|---|
| Wide | 215 volts[2] |
| Medium | 220 volts |
| Narrow | 225 volts |

TABLE 4: No Voltage Threshold

| Failure mode | |
|---|---|
| Wide | 82 volts |
| Medium | 63 volts |
| Narrow | 63 volts |

TABLE 5: Other failure modes non-dependent on settings

| Failure mode | |
|---|---|
| Low frequency | 46 Hz |
| High frequency | 64 Hz |
| Overvoltage | 135 volts (264 volts) |

[1] All voltages are measured RMS
[2] All voltages are measured RMS

FIGURE 6

DUAL-INPUT SINGLE-OUTPUT POWER SUPPLY

CROSS REFERENCE TO RELATED APPLICATIONS

The present application is a US National Stade of International Application No. PCT/CA2016/050380, filed on Apr. 1, 2016, which claims priority under 35 U.S.C. 119(e) of U.S. Provisional Patent Application No. 62/142,060, filed on Apr. 2, 2015, the contents of which are hereby incorporated by reference.

TECHNICAL FIELD

The present disclosure relates to power supply units (PSUs) and methods of operating same.

BACKGROUND OF THE ART

The life span of a power supply, or mean time between failures (MTBF) is estimated at roughly 100,000 hours. Power supplies for servers, industrial control equipment, or other equipment where reliability is important may be hot swappable and may incorporate redundancy to allow for a faulty power supply to be replaced without downtime.

When providing redundancy, two or more power supplies are connected into a connecting board that allows the devices to speak to each other. Each power supply is usually housed in its own housing unit and has a single input and a single output. While this setup is suitable for redundancy, it is not a cost-effective or resource-management effective solution.

Therefore, there is a need for an improved power supply design.

SUMMARY

There is described a dual-input single-output power supply with shared circuitry for the rectifying and power conversion stages and duplicated circuitry for the filtering and protection stages, and with a switching device to switch between the two inputs. Operation of the switching device is controlled according to the status of the input power feeds and one or more switching conditions.

In accordance with a first broad aspect, there is provided a dual-input single-output power supply. The power supply comprises a first input configured for receiving a first alternating current (AC) input voltage from a first AC source and a second input configured for receiving a second AC input voltage from a second AC source. A first filtering and protection unit is connected to the first input and comprises circuitry for filtering the first AC input voltage and providing protection from the first AC source. A second filtering and protection unit is connected to the second input and comprises circuitry for filtering the second AC input voltage and providing protection from the second AC source. A switching device is connected to the first and second filtering and protection units and configured to selectively output one of the first AC input voltage and the second AC input voltage. A rectifying and power conversion unit is connected to the switching device for receiving the one of the first AC input voltage and the second AC input voltage, and comprises circuitry for converting the one of the first AC input voltage and the second AC input voltage into a direct current (DC) output voltage for delivery to a load.

In some embodiments, the power supply further comprises a control unit operatively connected to the first input, the second input, and the switching device, and configured for monitoring a status of the first AC input voltage and the second AC input voltage received at the first input and the second input, respectively, and controlling switching operation of the switching device accordingly.

In some embodiments, the control unit comprises a monitoring unit having at least one detecting unit for detecting an input power value at the first input and the second input and at least one transformer unit for sensing a power feed status at the first input and the second input; and a microcontroller for receiving the input power value and the power feed status from the monitoring unit and outputting control signals to the switching device.

In some embodiments, the control unit further comprises a memory having stored therein a plurality of switching conditions associated with a plurality of AC input voltage statuses, and wherein the microcontroller is configured to retrieve from the memory one of the switching conditions corresponding to a received AC input voltage status and output the control signals in accordance with the retrieved switching condition.

In some embodiments, the at least one detecting unit comprises a first detecting unit connected between the microcontroller and the first input and a second detecting unit connected between the microcontroller and the second input.

In some embodiments, the at least one transformer unit comprises a first transformer unit connected between the microcontroller and the first filtering and protection unit and a second transformer unit connected between the microcontroller and the second filtering and protection unit.

In some embodiments, the power supply further comprises a connector connected to an output of the rectifying and power conversion unit to output the DC output voltage; and an optocoupler connected between the control unit and the connector to provide signals between the control unit and the connector.

In some embodiments, the first filtering and protection unit and the second filtering and protection unit are composed of a same arrangement of components.

In some embodiments, the switching device comprises a first solid state switching device connected to the first filtering and protection unit; and a second solid state switching device connected to the second filtering and protection unit.

In some embodiments, the rectifying and power conversion unit comprises a rectifier and an AC-DC power converter connected together.

In accordance with another broad aspect, there is provided a method for operating a dual-input single-output power supply. The method comprises monitoring a first status of a first input feed at a first input of the power supply and a second status of a second input feed at a second input of the power supply; determining if at least one of the first status and the second status meets at least one switching condition; and outputting at least one control signal comprising instructions to cause a switching device connected to the first input and the second input to switch between the first input feed and the second input feed when the at least one switching condition is met.

In some embodiments, the method further comprises evaluating a switch back to a previous input feed after having switched between the first input feed and the second input feed by determining if at least one switch back condition has been met; and switching back to the previous input feed when the at least one switch back condition has been met.

In some embodiments, determining if at least one switch back condition has been met comprises determining if a time elapsed since switching meets a time threshold.

In some embodiments, determining if at least one switch back condition has been met comprises determining if a present input feed corresponds to a designated primary feed; and switching back to the previous input feed when the present input feed is not the designated primary feed.

In some embodiments, the method further comprises a start-up process comprising determining a voltage level of the first input feed at the first input and the second input feed at the second input, and setting a mode of operation for the power supply as a function of the voltage level.

In some embodiments, setting a mode of operation comprises setting a first mode of operation for a voltage level of 120 Vac and setting a second mode of operation for a voltage level of 240 Vac.

In some embodiments, the method further comprises retrieving the at least one switching condition from memory.

In some embodiments, the at least one switching condition comprises any one of a lower voltage threshold, an upper voltage threshold, a lower frequency threshold, an upper frequency threshold, and a minimum time threshold.

In some embodiments, the at least one switching condition corresponds to one of a plurality of voltage settings available for the power supply.

In accordance with yet another broad aspect, there is provided a non-transitory computer readable medium having stored thereon program instructions for operating a dual-input single-output power supply. The program instructions are executable by a processor for monitoring a first status of a first input feed at a first input of the power supply and a second status of a second input feed at a second input of the power supply; determining if at least one of the first status and the second status meets at least one switching condition; and outputting at least one control signal comprising instructions to cause a switching device connected to the first input and the second input to switch between the first input feed and the second input feed when the at least one switching condition is met.

BRIEF DESCRIPTION OF THE DRAWINGS

Further features and advantages of the present invention will become apparent from the following detailed description, taken in combination with the appended drawings, in which:

FIG. 1b is a more detailed example of the power supply of FIG. 1a;

FIG. 6 illustrates an example embodiment of a plurality of switching conditions for operation of the power supply;

It will be noted that throughout the appended drawings, like features are identified by like reference numerals.

DETAILED DESCRIPTION

Figure 1A:
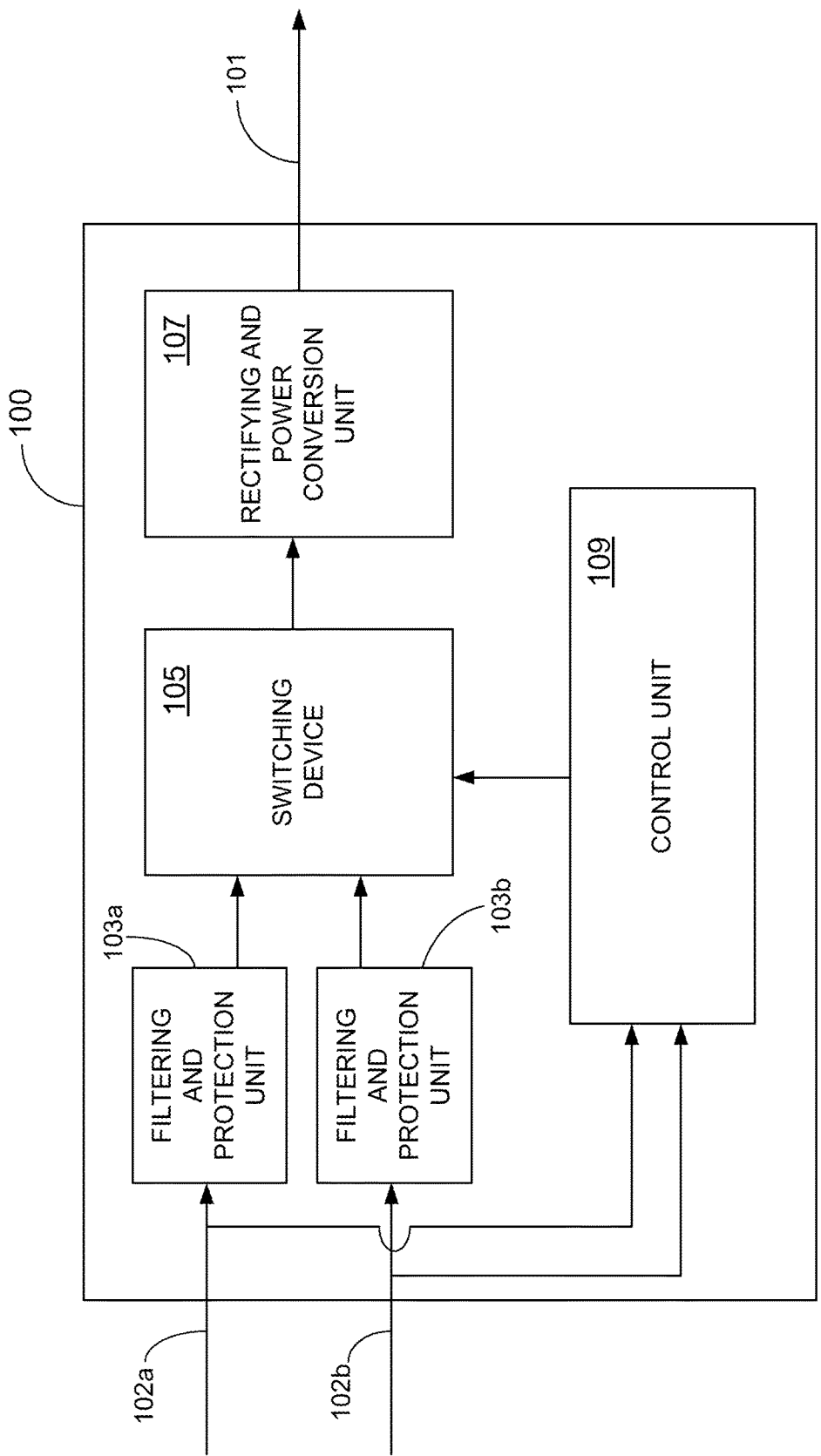
FIG. 1a is a schematic diagram illustrating an example embodiment of a dual-input single-output power supply.

FIG. 1a illustrates an example of a power supply 100 having two inputs 102a, 102b, and one output 101. The first and second inputs 102a, 102b each receive a feed from an alternating current (AC) source and provide an AC input voltage to the power supply 100. The AC input voltage from each input is fed to a first filtering and protection unit 103a and a second filtering and protection unit 103b, respectively, which may be identical or different from one another. The first and second filtering and protection units 103a, 103b, comprise circuitry for filtering the first and second AC input voltages and providing protection from the first and second AC sources. Both filtering and protection units 103a, 103b are connected to a switching device 105. The switching device 105 is configured to switch between a signal from the first filtering and protection unit 103a and a signal from the second filtering and protection unit 103b. Therefore, the switching device 105 selectively transmits the AC input voltage from the first input 102a or the second input 102b.

A rectifying and power conversion unit 107 is connected to an output of the switching device 105, and receives the signal from the selected one of the first filtering and protection unit 103a and the second filtering and protection unit 103b. The rectifying and power conversion unit 107 is configured to convert the selected AC input voltage into a direct current (DC) output voltage, for delivery to a load (not shown). In some embodiments, a control unit 109 is provided to monitor the incoming inputs 102a, 102b, and to control the switching device 105. Note that the control unit 109 may also be provided separately from the power supply 100.

Figure 1B:
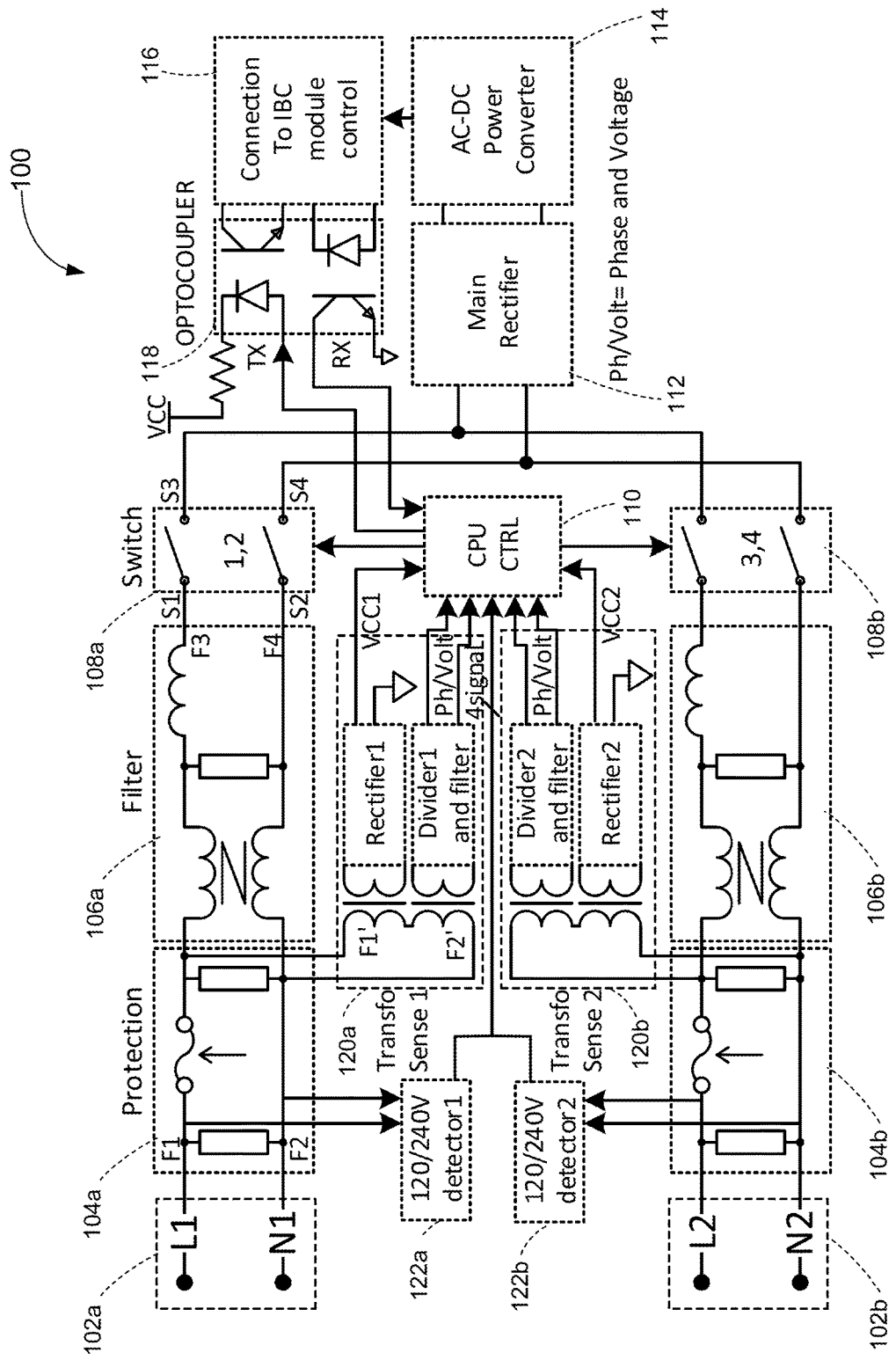

FIG. 1b is a more detailed example of the power supply 100, in accordance with one embodiment. The power supply 100 receives an input voltage at input 102a through input nodes (L1, N1) and an input voltage at input 102b at input nodes (L2, N2). As understood by those skilled in the art, the number of inputs 102a, 102b is set to two (2) for redundancy purposes. In some embodiments, 120 Vac or 240 Vac is received at inputs 102a, 102b. In other embodiments, the AC input feeds received at inputs 102a, 102b may be from 85 Vac to 264 Vac, at 43 to 65 Hz. Other embodiments may apply.

The first filtering and protection unit 103a comprises a first protection circuit 104a and a first filter circuit 106a, connected together. The second filtering and protection unit 103b comprises a second protection circuit 104b and a second filter circuit 106b, connected together. The switching device 105 is embodied by solid state switching devices 108a and 108b. Feed 102a provides its input to protection circuit 104a, which is in turn connected to filter circuit 106a, whose output is fed to switching device 108a. The switching devices 108a, 108b are used to switch between an AC input feed from input 102a and another AC input feed from input 102b, whereby one input feed acts as a primary power feed and the other input feed acts as a secondary power feed. A microcontroller 110 forms part of the control unit 109, in order to control operation of each switching device 108a, 108b.

The rectifying and conversion unit 107 comprises a rectifier 112 and an alternating current-direct current (AC-DC) power converter 114. The input AC voltage (i.e. from inputs 102a, 102b) directed through a given switching device 108a, 108b is converted into a DC voltage that is output by the AC-DC converter 114. In one embodiment, the DC voltage is further fed to remaining components of the power supply unit (not shown), and eventually to a load (not shown), using a connection 116 to which the AC-DC power converter 114 feeds the DC voltage. The connection 116 may be a connection to an Intermediary Bus Converter (IBC) module control that serves as a connecting board for the power supply unit. One or more output signals are also generated by the microcontroller 110 and sent to the connection 116, for example via an optocoupler 118, for delivery to the power supply unit components. It can be seen that the circuit of FIG. 1b shares the rectifying stage circuitry 112 and the AC/DC power conversion stage circuitry 114, which are provided after the switching devices 108a, 108b, while replicating the protection stage circuitry 104a, 104b and the filtering stage circuitry 106a, 106b, which are provided before the switching devices 108a, 108b.

In one embodiment, the microcontroller 110 comprises a processor, which may be any device that can perform operations on data. Examples are a central processing unit (CPU), a microprocessor, a field programmable gate array (FPGA), or a reconfigurable processor. The microcontroller 110 may be provided (or be in communication) with a memory, which in one embodiment is a non-volatile memory. The memory may be a main memory, such as a high speed Random Access Memory (RAM), or an auxiliary storage unit, such as a hard disk, flash memory, or a magnetic tape drive. The memory may be any other type of memory, such as a Read-Only Memory (ROM), Erasable Programmable Read-Only Memory (EPROM), electrically-erasable programmable read-only memory (EEPROM), Ferroelectric RAM (FRAM), or optical storage media such as a videodisc and or a compact disc.

Each input 102a, 102b is monitored and the microcontroller 110 uses feed status information to trigger and control the switching operation of the switching devices 108a, 108b accordingly. For this purpose, the control unit 109 may comprise a first transformer unit 120a and a second transformer unit 120b. The microcontroller 110 is connected to an output of the first transformer unit 120a and to an output of the second transformer unit 120b, and an input of the first transformer unit 120a is connected to the first protection circuit 104a while an input of the second transformer unit 120b is connected to the second protection circuit 104b. Each transformer unit 120a, 120b senses the status of the power feed by reading the AC voltage from the inputs 102a, 102b. Each transformer unit 120a, 120b then reduces and filters the read AC voltage, which is then sent (as a phase and voltage signal referred to as "Ph/Volt" in FIG. 1b) to the microcontroller 110 for analysis. The AC voltage sensed by the transformer units 120a, 120b is illustratively sent to Analog-to-Digital converter (ADC) input pins (not shown) provided at the microcontroller 110. In one embodiment, two (2) 10-bit ADC pins are provided for each transformer unit 120a, 120b. In one embodiment, the transformer units 120a, 120b also provide auxiliary power (designated as VCC1 and VCC2 in FIG. 1b) that is used for powering the microcontroller 110 and local electronics (e.g. the switching devices 108a, 108b and the optocoupler 118). Still, it should be understood that other configurations may apply and the auxiliary power may, for example, be provided by a dedicated transformer separate from transformer units 120a, 120b.

The control unit 109 may also comprise a first 120/240V detector 122a and a second 120/240V detector 122b, which are connected to the microcontroller 110. Each 120/240V detector 122a, 122b detects the value of the input power received from the corresponding main feed at inputs 102a, 102b, and accordingly outputs to the microcontroller 110 data indicating the power input value. It should be understood that the feeds at inputs 102a, 102b may not supply exactly 120V or 240V but rather supply a voltage having a value within a range of 120V and 240V. Accordingly, the 120/240V detectors 122a, 122b are configured to detect an input voltage between 85V and 190V (and accordingly conclude to a 120V input feed) and a minimum of 205V (and accordingly conclude to a 240V input feed).

The microcontroller 110 receives input (e.g. a 120 Hz analog input) from the first and second transformer units 120a, 120b and input (e.g. a 60 Hz digital input) from the first and second 120V/240V detectors 122a, 122b, which may together form a monitoring unit. Using the received input, the microcontroller 110 is able to monitor each AC feed at inputs 102a, 102b. The microcontroller 110 then processes the received data to output to the switching devices 108a, 108b signal(s) for controlling the switching operation thereof, thereby controlling switching between the feeds at the inputs 102a, 102b. The microcontroller 110 further outputs to the optocoupler 118 one or more signals indicating that the feed being switched to is active and indicating the quality of the input signal from the feed in question. This information may in turn be communicated to remaining power supply unit components (e.g. to the IBC module) via the connection 116. In some embodiments, the microcontroller 110 may also receive input from the optocoupler 118. For example, the microcontroller 110 may receive from the optocoupler 118 commands to modify the switching conditions of the switching devices 108a, 108b and overwrite some pre-configured status.

Figure 2:
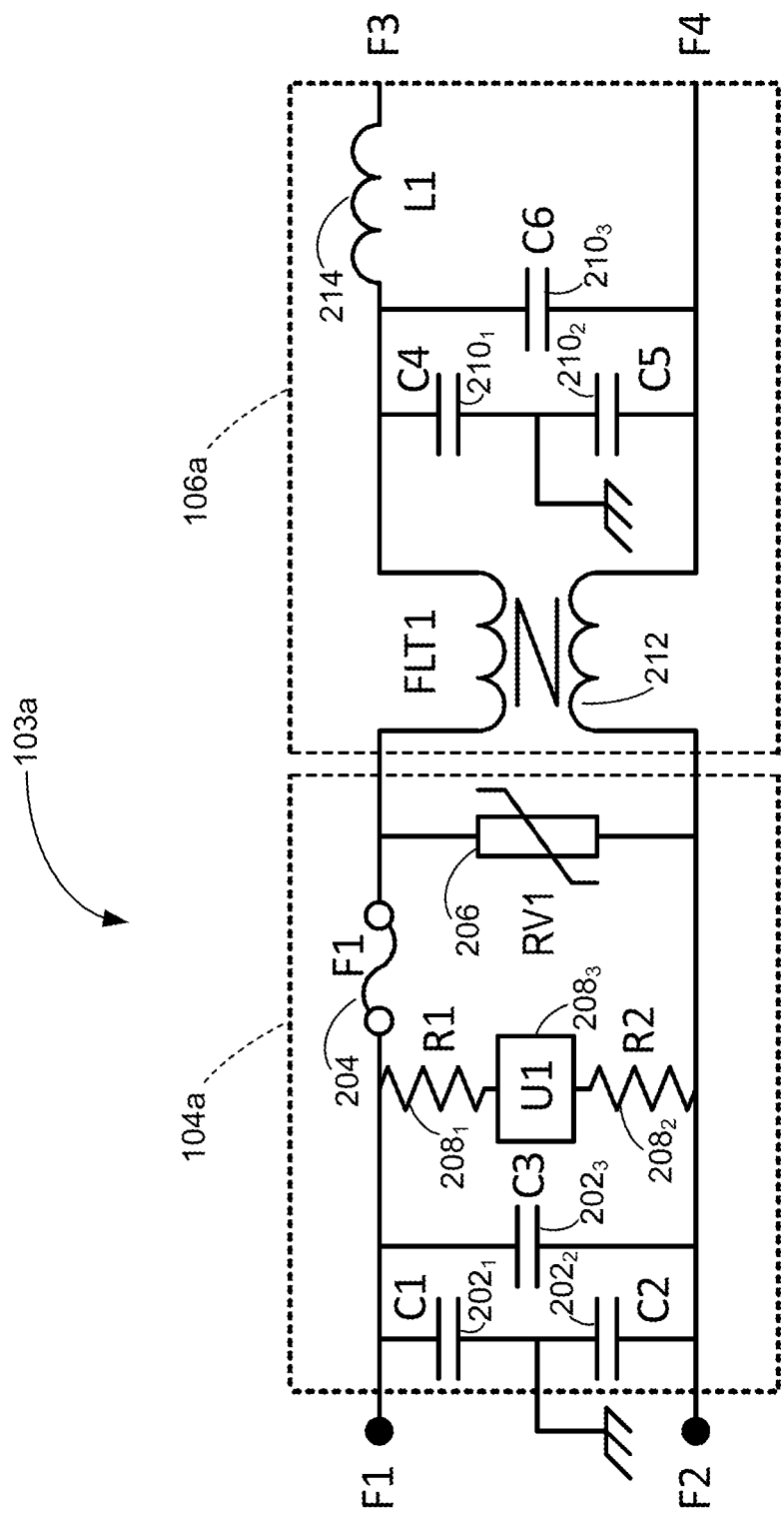
FIG. 2 is a schematic diagram of an example embodiment of a protection circuit and a filter circuit of FIG. 1b.

FIG. 2 illustrates an exemplary configuration for the first filtering and protection unit 103a, composed of first protection circuit 104a and first filter circuit 106a, which are connected to the input 102a. Since, the protection circuit 104b may replicate the protection circuit 104a and the filter circuit 106b may replicate the filter circuit 106a, only the details of the protection circuit 104a and the filter circuit 106a are illustrated in FIG. 2 and discussed herein. It should be understood that the protection circuit 104b and the filter circuit 106b may also differ from the protection circuit 104a and the filter circuit 106a shown in FIG. 2.

As can be seen in FIG. 2, the protection circuit 104a comprises three (3) capacitors $202_1$, $202_2$, and $202_3$, respectively having capacitances C1, C2, and C3. The capacitors $202_1$ and $202_2$ are connected in series between input nodes F1 and F2 of the protection circuit 104a. The capacitor $202_3$ is connected between nodes F1 and F2 in parallel to the series connection of capacitors $202_1$ and $202_2$. The input nodes F1, F2 further connect to the main feed at input 102a. The protection circuit 104a also comprises a fuse 204, which provides overcurrent protection and isolates the circuit from the AC supply in the event of a fault. A metal oxide varistor 206 is further provided to clamp the AC input voltage for protecting the circuit during line surge events. The protection circuit also comprises resistors $208_1$, $208_2$ and a specialized integrated circuit (IC) chip $208_3$ that cooperate to discharge all capacitors provided in the protection circuit 104a and in the filter circuit 106a after the line voltage (e.g. the AC input voltage from at input 102a) has been removed from the circuit, while dissipating negligible power during operation. In one embodiment, the IC chip $208_3$ contains a detection circuit and a metal-oxide-semiconductor field-effect transistor (MOSFET) for discharging the capacitors $202_1$, $202_2$, and $202_3$.

The filter circuit 106a is connected to the protection circuit 104a and comprises capacitors $210_1$, $210_2$, and $210_3$ respectively having capacitances C4, C5, and C6. The capacitors $210_1$ and $210_2$ are connected in series and capacitor $210_3$ is connected in parallel to the series connection of capacitors $210_1$ and $210_2$. A first inductor 212 is provided at an input of the filter circuit 106a and connects to an output of the protection circuit 104a (i.e. is connected between terminals of the varistor 206 and terminals of the capacitor $210_3$). A second inductor 214 is further provided, which is connected to a terminal of capacitor $210_3$ and constitutes with the inductor 212 and capacitors $202_1$, $202_2$, $202_3$, $210_1$, $210_2$, and $210_3$ an electromagnetic interference (EMI) filter. Such an EMI filter is used for reducing the common and differential mode conducted noise that may be produced by the circuit 103. The filter circuit 106a has output nodes F3, F4 that connect to the switching device 108a of FIG. 1.

Figure 3:
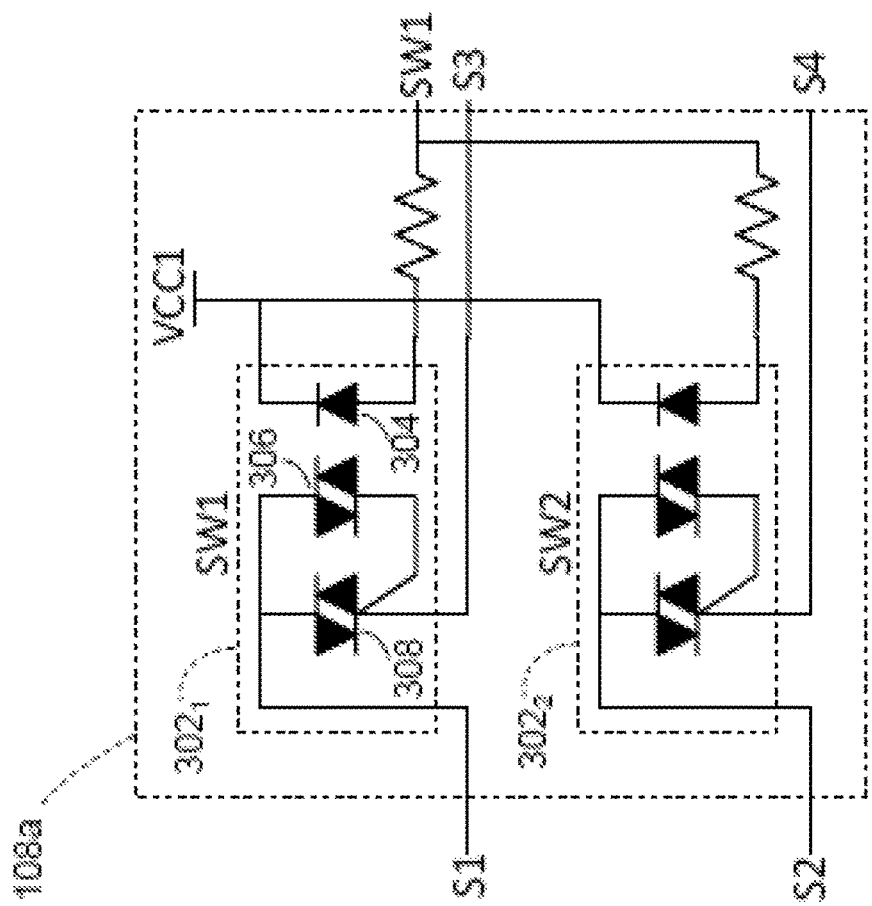
FIG. 3 is a schematic diagram of an example embodiment of a switching device of FIG. 1b.

FIG. 3 illustrates an exemplary configuration for the switching device 108a. Because the switching device 108b of FIG. 1b replicates the switching device 108a, only the details of the switching device 108a are illustrated in FIG. 3 and discussed herein. It should be understood that the switching device 108b comprises similar components to those of the switching device 108a shown in FIG. 3 but may also differ.

The switching device 108a comprises a first solid state switching unit $302_1$ and a second solid state switching unit $302_2$. In one embodiment, each switching unit $302_1$ and $302_2$ is implemented as a zero-crossing detector solid state relay (SSR), which is an integration of an infrared emitting diode (IRED) 304, a Phototriac Detector 306, and a main output Triac 308. The auxiliary power (e.g. VCC1) generated by the transformer unit (e.g. reference 120a in FIG. 1b) is supplied to the switching device 108a for allowing operation thereof. As discussed above, the switching device 108a, and particularly the switching input SW1 of switching device 108a, is controlled by the microcontroller 110. In one embodiment, electrical insulation for the switching device 108a is over 4 kV and switching capacity is 8 Amps, for a maximum input voltage (i.e. as received from the main feed at input 102a) of 400 Vac.

Figure 4:
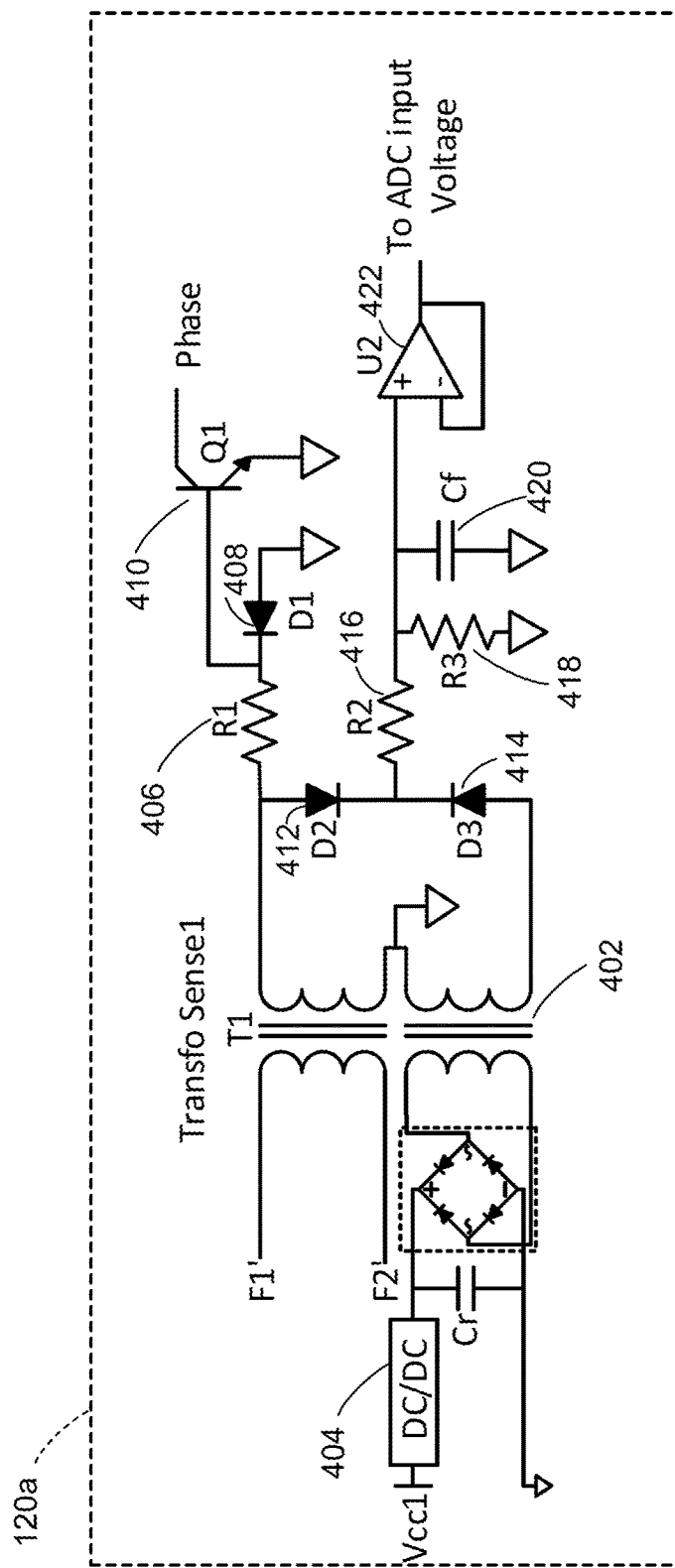
FIG. 4 is a schematic diagram of an example embodiment of a transformer unit of FIG. 1b.

FIG. 4 illustrates an exemplary configuration of the transformer unit 120a, which is used as a signal detector, i.e. to detect the state of the main feed at input 102a, and for providing auxiliary power to local electronics. Since the transformer unit 120b may replicate the transformer unit 120a, only the details of the transformer unit 120a are illustrated in FIG. 4 and discussed herein. It should be understood that the transformer unit 120b comprises similar components to those of the transformer unit 120a shown in FIG. 4 but may also differ.

In one embodiment, the transformer unit 120a comprises a transformer 402 having multiple cores in order to provide the auxiliary power (e.g. VCC1) needed to power the microcontroller 110 and other local circuit components, such as the switching devices 108a, 108b. In the embodiment shown in FIG. 4, the transformer 402 has four (4) windings (not shown), with the first winding having a DC resistance of 2920 mΩ, the second winding having a DC resistance of 92 mΩ, the third winding having a DC resistance of 92 mΩ, and the fourth winding having a DC resistance of 400 mΩ. The ratio of transformation from the primary side to the secondary side is illustratively 4:1. In particular, the transformer 402 may have a turns-ratio of 136:13:13:15, +/−3%, an inductance of 1250 μH, +/−10%, at 100 kHz/100 mV, a saturation current of 0.8 A, and an insulation at 4 kV. Other configurations may apply.

The voltage at the secondary side of the transformer 402 may then range from 12 V for a main feed input of 120 Vac, to 24 V for a main feed input of 240 Vac. The transformer 402 generates a first DC voltage, which is then fed to a high input range DC-DC converter 404 and converted into a second (lower) DC voltage (e.g. VCC1) that is ultimately used to feed local electronics. In one embodiment, the first voltage is 14 V for a main input feed of 120 Vac and 28 V for a main feed input of 240 Vac, and the second voltage is 5 V. Other embodiments may apply.

The transformer unit 120a further comprises a first resistor 406 having a resistance R1, a first diode 408, and an NPN transistor 410, which are together used for detecting the phase of the input signal (e.g. received from main feed at input 102a). The output of the transistor 410 (i.e. of the phase detection) is then fed directly into an input pin (not shown) provided in the microcontroller 110.

The transformer unit 120a also comprises diodes 412, 414, which together form a half rectifier that conditions the AC input signal (e.g. as received from the main feed at input 102a) read by the transformer unit 120a so as to only keep the upper part of the signal. Resistances 416, 418, which respectively have resistances R2 and R3, are also provided and together form a voltage divider used to reduce the conditioned voltage. In one embodiment, the voltage divider has a ratio of 0.18 (i.e. 2.16 V at a main feed input of 120 Vac and 4.5 V at a main feed input of 240 Vac). It should be understood that other embodiments may apply. The reduced voltage is in turn filtered by a small noise filter formed by a capacitor 420, which has a capacitance Cf. The filtered voltage output by the capacitor 420 also passes through an operational amplifier 422 whose output (i.e. the value of the filtered signal's amplitude) is then fed to the microcontroller's ADC input pin that is connected to the transformer unit 120a. The operational amplifier 422 illustratively has a follower configuration to match the input impedance of the microcontroller's ADC input pin, thereby protecting the microcontroller's ADC input. No extra winding needs to be provided at the input of the transformer unit 120a for sensing the 120V and 240V voltages. This in turn reduces the complexity of the transformer units 120a, 120b.

In one embodiment, the diodes 408, 412, 414 are low power rectifiers of any suitable type, such as the 1N914 type rectifier, the transistor 410 is of a standard type, such as the 2N2222 NPN-type bipolar junction transistor, and the operational amplifier may be any suitable low noise model, such as the OPA335 model. The following values may be used for the resistors 406, 416, 418: R1=5.36 kΩ, R2=43.2 kΩ, and R3=9.48 kΩ. The capacitor 420 may have a capacitance Cf of 0.01 μf. Other configurations may apply.

Figure 5:
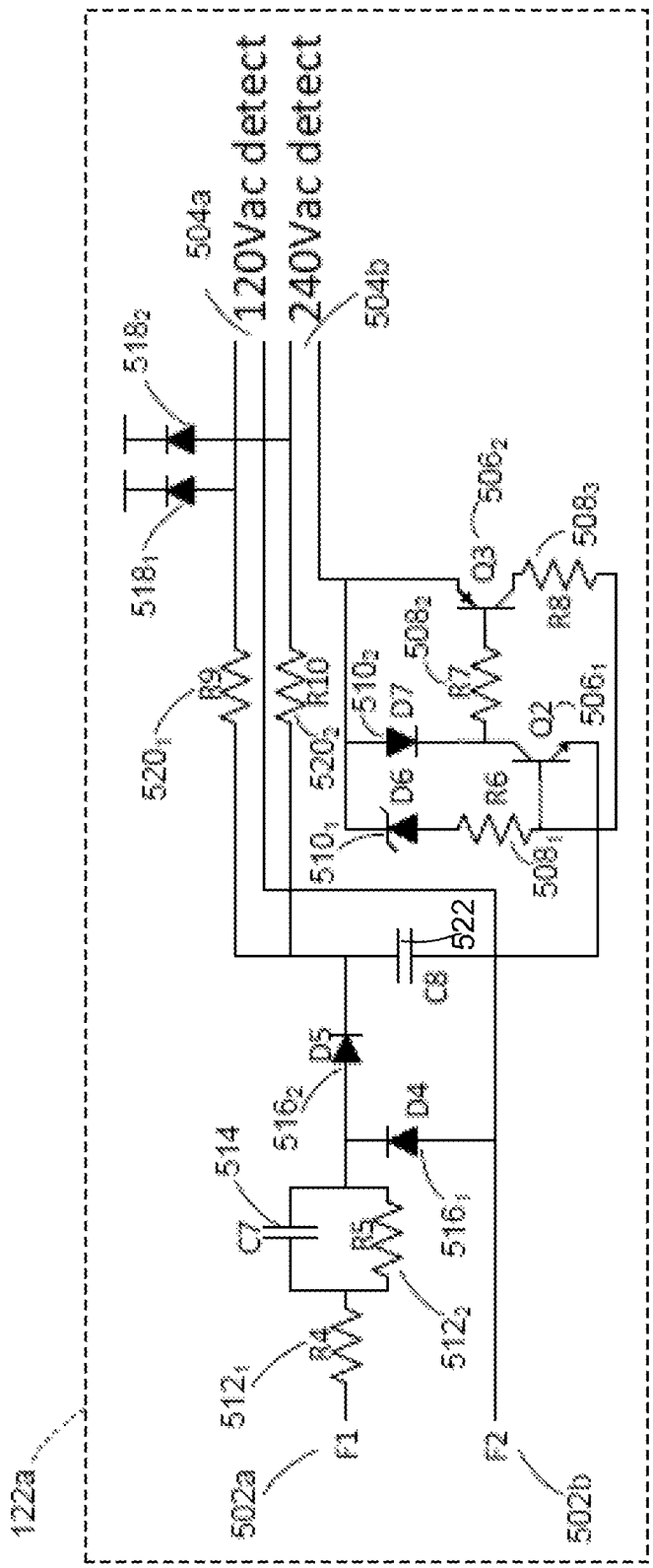
FIG. 5 is a schematic diagram of an example embodiment of a 120V/240V detector of FIG. 1b.

FIG. 5 illustrates an exemplary configuration for the 120/240V detector 122a. Since the 120/240V detector 122b may replicate the 120/240V detector 122a, only the details of the 120/240V detector 122a are illustrated in FIG. 5 and discussed herein. It should be understood that the 120/240V detector 122b may therefore comprise similar components to those of the 120/240V detector 122a shown in FIG. 5, but may also differ.

The 120/240V detector 122a allows the microcontroller 110 to dynamically adjust its overvoltage threshold so as to ensure that the input voltage received from the main power feed at input 102*a* is universal AC, i.e. remains in the range between 85 Vac and 264 Vac, and accordingly prevent overvoltage conditions. For this purpose, the illustrated 120/240V detector 122*a* comprises a first input (or pin) 502*a* and a second input (or pin) 502*b*, which are respectively connected to the inputs (F1, F2) of the protection circuit 104*a*. The AC voltage from the main feed 102*a* (which as discussed above is connected to the protection circuit 104*a* at F1, F2) is then detected at inputs 502*a*, 502*b*.

The 120/240 V detector 122*a* further comprises a first output (or pin) 504*a* (referred to in FIG. 5 as "120 Vac detect") and a second output (or pin) 504*b* (referred to in FIG. 5 as "240 Vac detect"), each output 504*a*, 504*b* having an active (or "ON") state and an inactive (or "OFF") state. In one embodiment, the active state is a logical state indicated by a logical "1" while the inactive state is a logical state indicated by a logical "0". When a 120 Vac input feed is detected (at input pints 502*a*, 502*b*), the first pin 504*a* is placed in the "ON" state (i.e. a logical "1" is output at pin 504*a*) while the second pin 504*b* remains in the "OFF" state (i.e. a logical "0" is output at pin 504*b*). When a 240 Vac input feed is detected, the first pin 504*a* remains in the "ON" state and the second pin 504*b* is also placed in the "ON" state (i.e. a logical "1" is output at pin 504*b*). In one embodiment, the first pin 504*a* remains in the active state due to the latching operation of a latching circuit formed by transistors 506$_1$ and 506$_2$ and related components provided in the detector circuitry (e.g. resistors 508$_1$, 508$_2$, and 508$_3$ having respective resistances R6, R7, R8, and diodes 510$_1$ and 510$_2$). The output from both pins 504*a*, 504*b* is fed to the microcontroller 110, which can accordingly determine the level of power generated by the feed at input 102*a*.

In order to control activation (or deactivation) of the output pins 504*a*, 504*b* in accordance with the power level detected at the input pins 502*a*, 502*b*, the 120/240 V detector 122*a* further comprises resistors 512$_1$, 512$_2$ having respective resistances R4 and R5, a capacitor 514 having a capacitance C7, a diode 516$_1$, and a diode 516$_2$, which together provide a low DC voltage range (e.g. between 4.5 V and 6 V). This low DC voltage range is provided in order to allow proper operation of the latching circuit, and in turn ensure that a proper output is presented at pins 504*a*, 504*b* and sent to the microcontroller 110. Overvoltage clipping diodes 518$_1$, 518$_2$ are also respectively connected to the pins 504*a*, 504*b* and used to protect the microcontroller's input. Resistors 520$_1$, 520$_2$ are further respectively connected to the pins 504*a*, 504*b* for limiting the input current and protecting the input pin of the microcontroller 110. A capacitor 522 having a capacitance C8 may also be used as a rectifier capacitor to rectify the output of diode 516$_2$.

In one embodiment, the following resistance values may be used for resistors 512$_1$, 512$_2$, 508$_1$, 508$_2$, 508$_3$, 520$_1$, 520$_2$: R4=470Ω, R5=220 kΩ, R6=330Ω, R7=2.2 kΩ, R8=330Ω, and R9=R10=40Ω. The following may be used for the capacitors 514 and 522: C7=0.33 µf and C8=10 µf (ceramic). The diodes 516$_1$, 516$_2$ may be of the 1N4001 type with ratings 1 kV, 1 A, the diode 510$_1$ may be a Zener diode with ratings 15 V, 500 mW, and the diode 510$_2$ may be of the 1N4148 type with ratings 75 V, 150 mA. The protection diodes 518$_1$, 518$_2$ may be of type 1N914. In addition, transistor 506$_1$ may be of the 2N222 NPN-type and transistor 506$_2$ of the 2N2907 PNP-type. Other configurations may apply.

As discussed above, the microcontroller 110 uses the information (e.g. the feed status information) received from the transformer units 120*a*, 120*b* and the 120/240V detectors 122*a*, 122*b* to control the switching operation of switching devices 108*a*, 108*b* as a function of one or more switching conditions. In some embodiments, the one or more switching conditions comprise a series of threshold voltages. The threshold voltages are illustratively stored in memory and retrieved therefrom for analysis by the microcontroller 110. The microcontroller 110 may also store in the memory all data (e.g. feed status data) received from the transformer units 120*a*, 120*b* and the 120/240 V detectors 122*a*, 122*b* for data logging purposes.

As can be seen in FIG. 6, the switching conditions may also correspond to upper and/or lower frequency thresholds, as well as time thresholds. Different thresholds may be set depending on a mode of operation of the power supply 100, i.e. whether it is operating with input feeds of 120 Vac or 240 Vac. Different thresholds may also be set depending on a voltage setting available to the power supply 100. When the microcontroller 110 receives an indication (e.g. from the 120/240V detector 122*a* or 122*b*) that the AC input received from a given main feed at input 102*a* or 102*b* is at the 120 V level, the applicable voltage threshold (e.g. low voltage threshold or no voltage threshold) is determined from Table 2 or Table 4. In one embodiment, in the case of low voltage detection, three (3) voltage settings are available at the 120 V threshold, namely "Wide" corresponding to a voltage threshold of 95 V, "Medium" corresponding to a voltage threshold of 100 V, and "Narrow" corresponding to a voltage threshold of 105 V (with all voltages in root mean square (RMS)). This means that the microcontroller 110 will cause the switching devices 108*a*, 108*b* to be operated so as to switch from one feed (e.g. input 102*a*) to the other (e.g. input 102*b*) when the feed voltage is no lower than 95 V (i.e. between 120 V and 95 V) for the "Wide" voltage setting, when the feed voltage is no lower than 100 V for the "Medium" voltage setting, and when the feed voltage is no lower than 105 V for the "Narrow" voltage setting.

When the microcontroller 110 receives information that the AC input received from the main feed at input 102*a* or 102*b* is at the 240 V level, the applicable low voltage threshold is determined from Table 3 or Table 4. In one embodiment, in the case of low voltage detection, three (3) voltage settings are available at the 240 V threshold, namely "Wide" corresponding to a voltage threshold of 215 V, "Medium" corresponding to a voltage threshold of 220 V, and "Narrow" corresponding to a voltage threshold of 225 V (with all voltages in RMS). This means that the microcontroller 110 will cause the switching devices 108*a*, 108*b* to be operated so as to switch from one feed (e.g. input 102*a*) to the other (e.g. input 102*b*) when the feed voltage is no lower than 215 V for the "Wide" voltage setting, when the feed voltage is no lower than 220 V for the "Medium" voltage setting, and when the feed voltage is no lower than 225 V for the "Narrow" voltage setting.

In cases where the microcontroller 110 detects no voltage (e.g. the microcontroller 110 detects that the power cord is unplugged), the applicable no voltage threshold is determined from Table 4 regardless of whether the microcontroller 110 receives information that the AC input is at 120 V or 240 V. In particular, in the case of no voltage detection, three (3) voltage settings are available, namely "Wide" corresponding to a voltage threshold of 82 V, "Medium" corresponding to a voltage threshold of 63 V, and "Narrow" corresponding to a voltage threshold of 63 V (with all voltages in RMS). This means that the microcontroller 110 will cause the switching devices 108*a*, 108*b* to be operated so as to switch from one feed (e.g. input 102*a*) to the other (e.g. input 102*b*) when the feed voltage is no lower than 82

V for the "Wide" voltage setting, when the feed voltage is no lower than 63 V for the "Medium" voltage setting, and when the feed voltage is no lower than 63 V for the "Narrow" voltage setting.

It should be understood that the applicable voltage threshold (low voltage or no voltage) is determined in accordance with the detected status of the power feed. Other voltage thresholds, and accordingly other voltage settings, may apply. It should also be understood that the voltage setting applicable for a given application may be set by default and stored in memory. The default value may also be modified, e.g. by an operator using a suitable communication interface or port.

According to the information stored in memory, the time at which the switching operation is to occur may also be determined by the microcontroller 110 depending on the applicable voltage threshold for the case at hand. For example, referring to Table 1, if the low voltage threshold is being considered, the microcontroller 110 will cause the switching operation to occur 36 ms after the microcontroller 110 has concluded its analysis. If the low voltage threshold is being considered, the microcontroller 110 may also cause the switching operation to occur 20 ms after the microcontroller 110 has concluded its analysis. In other words, two (2) response times (20 and 36 ms) are illustratively provided at the low voltage threshold. If the no voltage threshold is being considered, the microcontroller 110 will cause the switching operation to occur 4 ms after the microcontroller 110 has concluded its analysis. In one embodiment, the microcontroller 110 applies the delays (e.g. 4 ms, 20 ms, or 36 ms) after having determined the peak voltage of the AC input signal sensed from the main feed at inputs 102a, 102b.

As can be seen from Table 5, the microcontroller 110 may also cause the switching operation to occur in other cases, regardless of the voltage settings. In particular, certain failure modes may cause the switching operation to occur. For example, the microcontroller 110 may cause the switching operation to occur upon detecting that the frequency of the input signal (as received from the main feed at inputs 102a, 102b) is not within the range of 46 Hz and 64 Hz. The microcontroller 110 may also cause the switching operation to occur if an overvoltage condition is detected, e.g. the input voltage is at 135 V instead of 120 V, or 264 V instead of 240 V.

It should be understood that the values of the voltage thresholds, switch times, and frequency thresholds shown in FIG. 6 are illustrative only and that other values may apply, depending on the applications and parameters, such as the level of noise in the circuit. It should also be understood that, in one embodiment, in order to determine whether to switch from one feed to another, the microcontroller 110 may refer to tables 1, 2, 3, and 4 (and any other tables, if applicable) simultaneously and continuously.

Figure 7A:
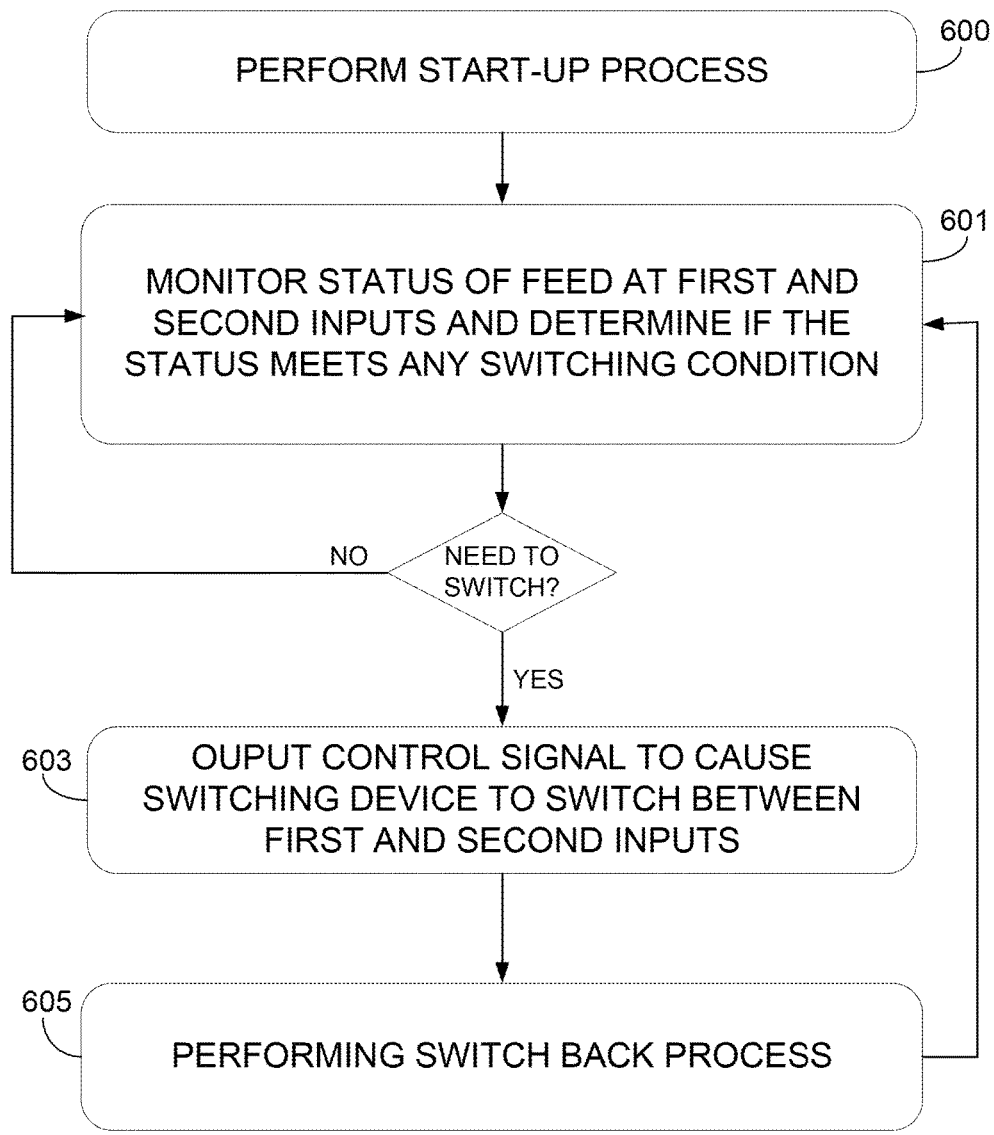
FIG. 7a is a flowchart of a method for operating a dual-input single-output power supply, in accordance with one embodiment.

Referring to FIG. 7a, there is illustrated an example embodiment of a method for operating a dual-input single-output power supply as described herein. In some embodiments, the method comprises a first step 600 of performing a start-up process. The start-up process is used generally to read the initial feeds at inputs 102a, 102b and ensure that both inputs are functioning properly. The start-up process of step 600 may also be used to determine mode voltage level of the input feeds, for example whether the feed is a 120 Vac feed or a 240 Vac feed, and whether both inputs 102a, 102b are at the same value.

Once the start-up process is completed, step 601 consists in monitoring a status of the feeds at inputs 102a, 102b and determining if a status of either of the feeds meets any of the switching conditions, as illustrated in the tables of FIG. 6. Note that the switching conditions may include one or more of a change in input voltage of one or both feeds, a change in frequency in one or both feeds, or simply a loss of voltage at one or both inputs 102a, 102b. The switching conditions may also include an upper and/or lower threshold value for frequency and/or voltage. A detected error may also be considered a switching condition. In some embodiments, more than one switching condition may be associated with a given feed status.

When the one or more switching condition associated with the present feed status is met, a control signal is output by the control unit 109 to cause the switching device 105 to switch its feed from input 102a to input 102b or vice versa, as per step 603.

In some embodiments, a step 605 of evaluating whether the feed should be switched back is also provided. This step will be explained in more detail below with regards to FIG. 9.

Figure 7B:
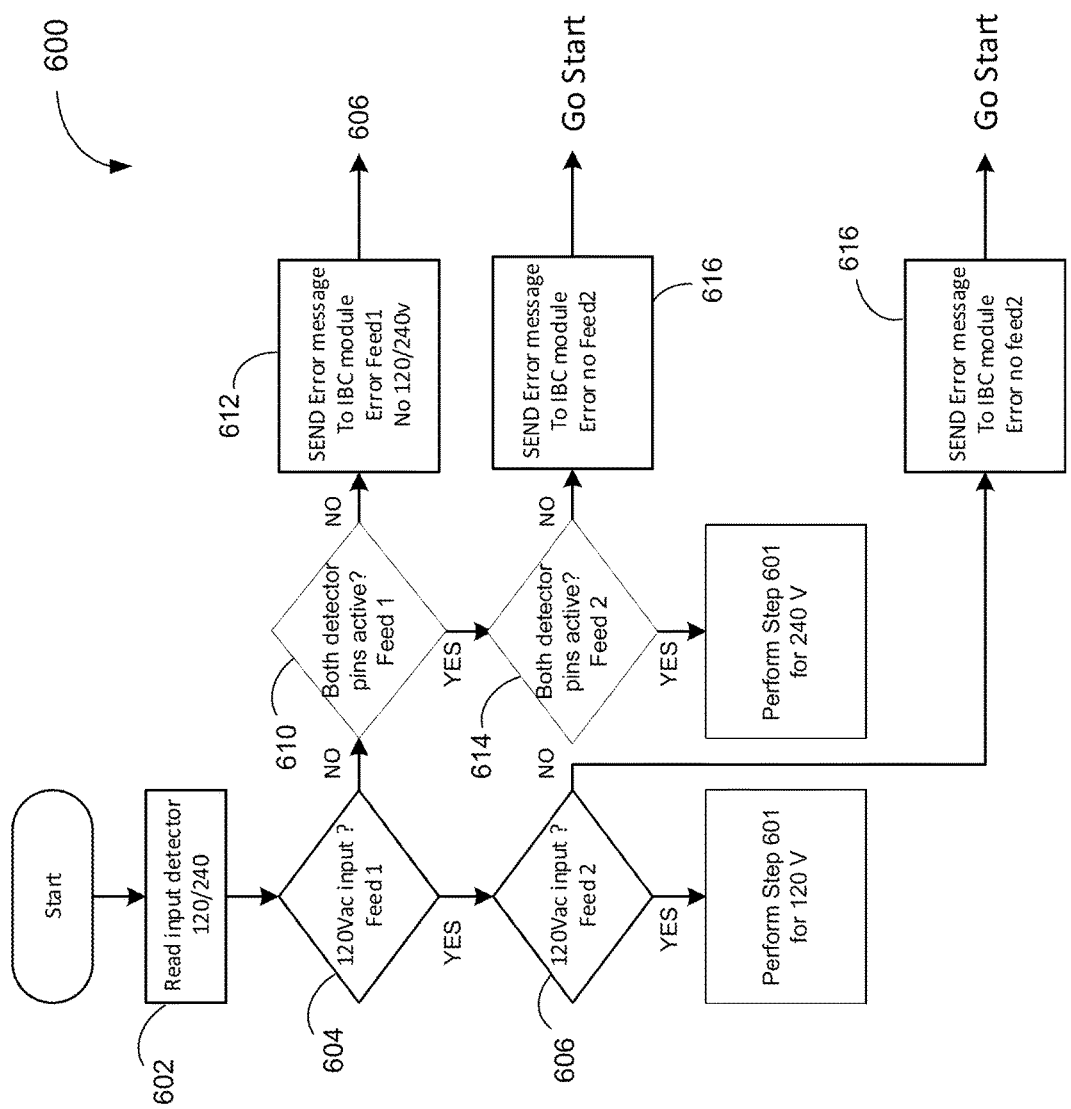
FIG. 7b is a flowchart of an example embodiment of a start-up process.

Referring now to FIG. 7b, there is illustrated an example embodiment of the start-up process as per step 600. The start-up process may be implemented at the microcontroller 110 and comprises reading at step 602 the input received from the 120/240 V detectors 122a, 122b. The next step 604 is to assess whether a 120 Vac input is read from the first main feed at input 102a. If this is the case, the next step 606 is to assess whether a 120 Vac input is read from the second main feed at input 102b. If this is the case, the monitoring process is performed at step 601 for an input feed of 120 V. If it is determined at step 604 that a 120 Vac input is not read from the first feed, the next step 610 is to determine whether both detector pins 504a, 504b are active for the first feed. If this is not the case, an error message, which indicates that an error has occurred at the first feed and that no 120 V/240 V input has been detected, is sent at step 612 to other components of the power supply unit (e.g. to the IBC module). The method 600 then flows to step 606.

If it is determined at step 610 that both detector pins are active for the first feed, the next step 614 is to assess whether both detector pins are active for the second feed. If this is not the case, an error message, which indicates that an error has occurred and that no second feed has been detected, is sent at step 616 to other components of the power supply unit (e.g. to the IBC module) and the method 600 may then be restarted. Otherwise, if it is determined at step 614 that both detector pins are active for the second feed, the monitoring step 601 is performed for a 240 V input feed. If it is determined at step 606 that no 120 Vac input is read from the second feed (after it has been determined that a 120 Vac input has been read for the first feed), the method 600 flows to step 616 of generating an error message and the method 600 may then be restarted. It should be understood that the error message is generated at step 616 because the system does not support having one feed at 120 Vac and the other at 240 Vac.

Figure 8:
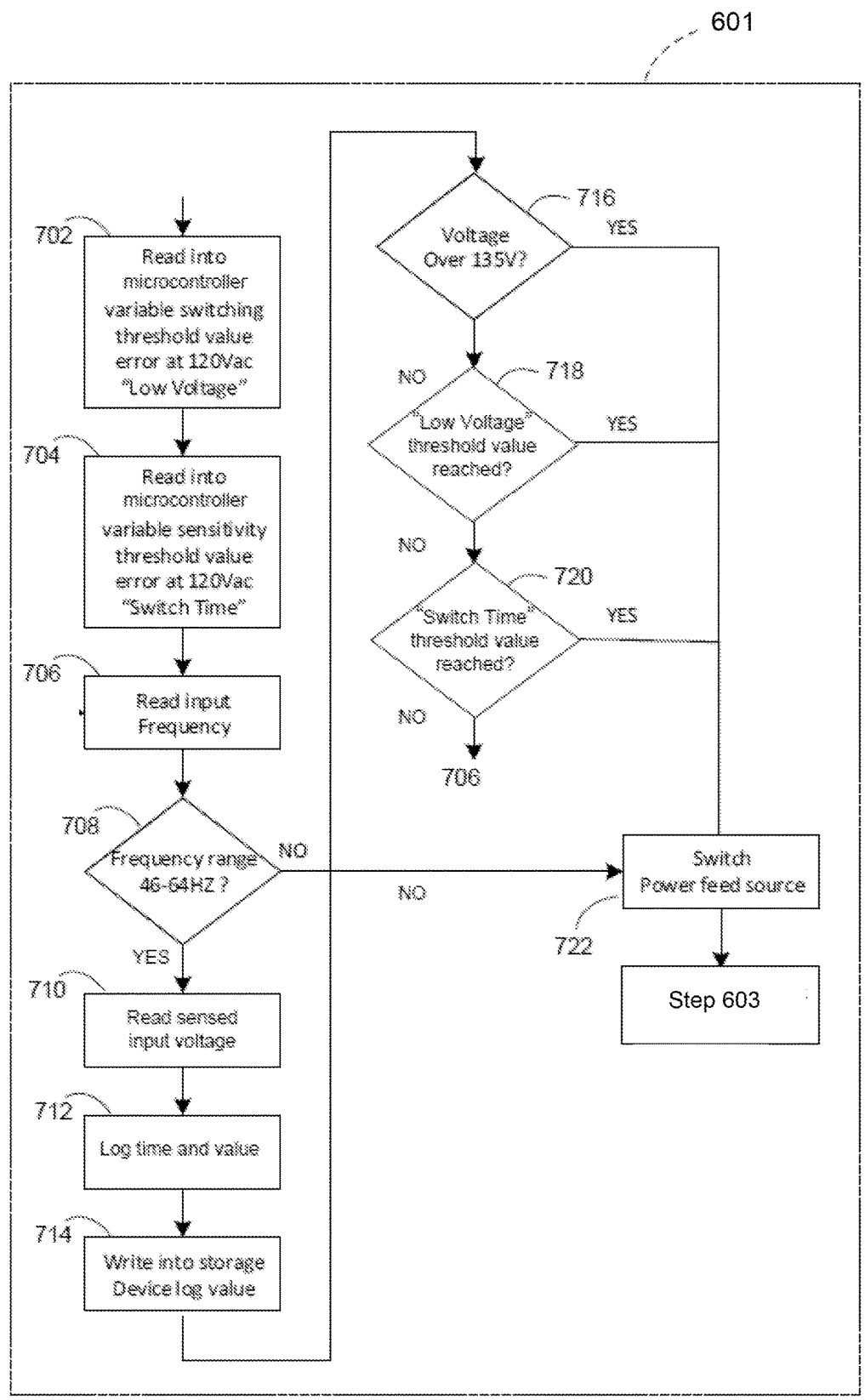
FIG. 8 is a flowchart an example embodiment of a 120V monitoring process.

Referring to FIG. 8, an example embodiment of step 601 is illustrated for an input feed of 120 V. It should be understood that the same monitoring process may be performed for an input feed of 240 V, except that the relevant voltage value would be 240 Vac instead of 120 Vac. A single monitoring process may also be provided for both 120 Vac and 240 Vac but is not illustrated herein for simplicity.

Step 601 comprises, at step 702, reading into the microcontroller 110, e.g. reading from the memory associated therewith, a variable switching threshold value error (referred to as "Low Voltage" or "No Voltage") at 120 Vac. As discussed above with reference to FIG. 6, step 702 may comprise querying the memory to determine (e.g. from the tables stored therein) the low voltage or no voltage threshold value applicable for the case at hand. As shown in FIG. 6, the low voltage threshold value may be 95 V if a "Wide" voltage setting applies for the case at hand, 100 V for a "Medium" voltage setting, or 105 V for a "Narrow" voltage setting while the no voltage threshold value may be 82 V if a "Wide" voltage setting applies for the case at hand and 63 V for a "Medium" or "Narrow" voltage setting.

The next step 704 is to read into the microcontroller 110 a variable sensitivity threshold value error (referred to herein as "Switch Time") at 120 Vac. The variable sensitivity threshold value error indicates the time at which the microcontroller 110 should cause switching between feed sources. As discussed above with reference to FIG. 6, step 704 may comprise querying the memory to determine (e.g. from the tables stored therein) the switch time corresponding to the low voltage threshold determined at step 702. As illustrated in Table 1 of FIG. 6, it can be determined from this query that the microcontroller should switch to the other feed after a delay of 36 ms. It should be understood that, in the case of the 240 V process, steps 702 and 704 would comprise reading the threshold value errors at 240 Vac rather than at 120 Vac.

The input frequency is then read at step 706 and it is assessed at step 708 whether the frequency range is between 46 Hz and 64 Hz. If this is the case, the sensed input voltage (as detected by the transformer units 120a, 120b is read at step 710. The time at which the input voltage is read and the value of the sensed input voltage are then logged at step 712. The log value is further written into a storage device (e.g. to memory) at step 714 for subsequent use. At step 716, it is then assessed whether the input voltage sensed at step 710 is over 135 V. If this is not the case, it is assessed at step 718 whether the sensed input voltage read at step 710 has reached the "Low Voltage" or "No Voltage" threshold value read at step 702 (i.e. whether the sensed input voltage is lower than the value of "Low Voltage" or "No Voltage"). If this is not the case, it is assessed at step 720 whether the "Switch time" threshold value read at step 704 has been reached (i.e. whether it is time for the switching operation of occur). If this is not the case, the method flows back to step 706 of reading the input frequency.

If it is determined at step 716 that the sensed input voltage is over 135 V, it is determined at step 718 that the sensed input voltage read at step 710 has reached the "Low Voltage" threshold value read at step 702, it is determined at step 720 that the "Switch time" threshold value read at step 704 has been reached, or it is determined at step 708 that the frequency is not between 46 Hz and 64 Hz, the method flows to the step 722 of switching between power feed sources by the microcontroller 110 controlling the operation of the switching devices 108a, 108b. The next step is then to output the control signal, as per step 603.

Figure 9:
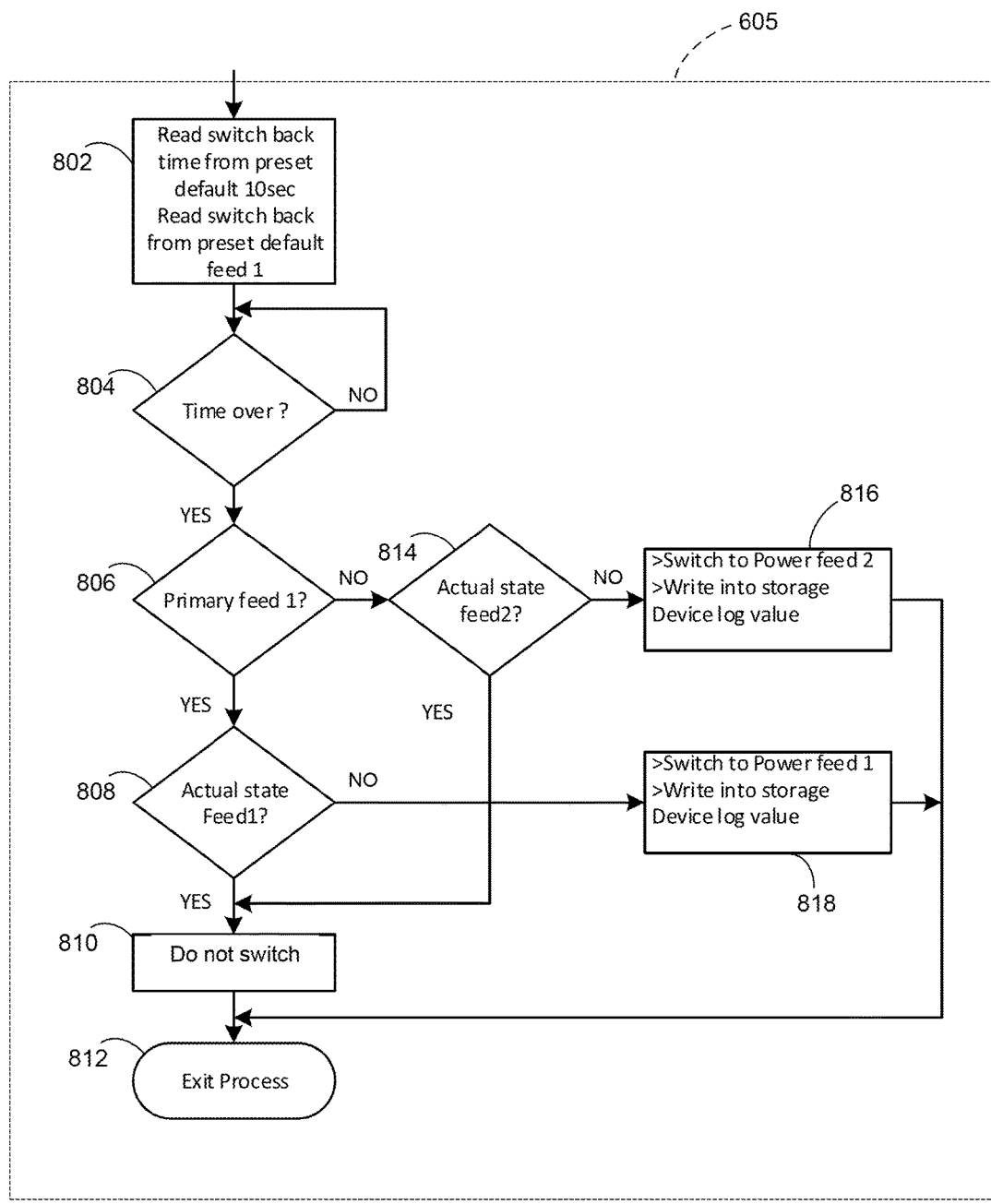
FIG. 9 is a flowchart of an example embodiment of performing a switch back process.

Referring now to FIG. 9, the step 605 of performing the switch back process will now be described. The default power feed is illustratively the primary feed (e.g. feed 1) and the switch back process is performed to return to the default power feed. Switch back conditions may be provided, such as timing or designated settings for a primary feed. In one embodiment, step 605 comprises reading from memory at step 802 a default switch back timing value and a default power feed (i.e. the primary feed 1, e.g. input 102a) that should be switched backed to. In one embodiment, the default switch back timing value is ten (10) seconds. It should be understood that, depending on the application, other values may apply but it may be desirable for the switch back timing value to be at least ten (10) seconds. It should also be understood that the switch back timing value and the default power feed stored in memory may be modified, e.g. a by an operator, using any suitable communication interface or port.

The next step 804 is then to determine whether at least one switch back condition has been met. In the example illustrated, it is determined whether the time elapsed since the last switching event is above the default switch back time, e.g. has it been more than ten (10) seconds since the last switching event. If this is not the case, the method repeats step 804. Otherwise, the next step 806 is to assess whether the first feed (feed 1) has been designated as the primary feed (to which the system should switch back). If this is the case, the next step 808 is to assess whether the actual state of the power feed is the first feed (feed 1) (i.e. the system is currently switched to the first feed). If this is the case, the next step 810 is to not switch feeds (since the system is already switched to the default feed, i.e. feed 1) and perform an exit process at step 812. The exit process corresponds to the default power state of the system in which the system, in normal operation, is returned to the primary feed (i.e. the default power state). It should however be understood that this default power state may be modified by a user, e.g. using any suitable communication interface or port.

If it is determined at step 806 that the first feed is not designated as the primary feed (i.e. the second feed, feed 2, is the primary feed), the next step 814 is to assess whether the actual state of the power feed is the second feed. If this is the case, the method flows to step 810 of not switching feeds (since the system is already switched to the default feed, i.e. feed 2). Otherwise, the next step 816 is to switch from the current feed to the second power feed and write all information related to the switching event and power feed state (referred to as "Device log value" in FIG. 9) into storage. The method may then proceed with the exit process at step 812. If it is determined at step 808 that the actual state of the power feed is not the first feed, the next step 818 is to switch back to the first power feed (e.g. to input 102a), i.e. return to the default state, and write the switching information into storage. The method may then proceed with the exit process at step 812.

Using the proposed power supply and methods discussed herein, it becomes possible to provide a dual-input single-output power supply where switching between feeds can be performed accurately with a low level of complexity. In addition, cost reduction and better mean time between failures (MTBF) can be achieved for dual redundant AC systems. Monitoring and diagnostic of the power feed can also be readily performed.

It should be noted that the present invention can be carried out as a method, can be embodied in a system, and/or on a computer readable medium. The embodiments of the invention described above are intended to be exemplary only. The scope of the invention is therefore intended to be limited solely by the scope of the appended claims.

The invention claimed is:
1. A dual-input single-output power supply comprising:
   a first input configured for receiving a first alternating current (AC) input voltage from a first AC source;
   a second input configured for receiving a second AC input voltage from a second AC source;
   a first filtering and protection unit connected to the first input and comprising circuitry for filtering the first AC input voltage and providing protection from the first AC source;

a second filtering and protection unit connected to the second input and comprising circuitry for filtering the second AC input voltage and providing protection from the second AC source;

a switching device connected to the first and second filtering and protection units and configured to selectively output one of the first AC input voltage and the second AC input voltage; and a rectifying and power conversion unit connected to the switching device for receiving the one of the first AC input voltage and the second AC input voltage, and comprising circuitry for converting the one of the first AC input voltage and the second AC input voltage into a direct current (DC) output voltage for delivery to a load.

2. The power supply of claim 1, further comprising a control unit operatively connected to the first input, the second input, and the switching device, and configured for monitoring a status of the first AC input voltage and the second AC input voltage received at the first input and the second input, respectively, and controlling switching operation of the switching device accordingly.

3. The power supply of claim 2, wherein the control unit comprises:
 a monitoring unit having at least one detecting unit for detecting an input power value at the first input and the second input and at least one transformer unit for sensing a power feed status at the first input and the second input; and
 a microcontroller for receiving the input power value and the power feed status from the monitoring unit and outputting control signals to the switching device.

4. The power supply of claim 3, wherein the control unit further comprises a memory having stored therein a plurality of switching conditions associated with a plurality of AC input voltage statuses, and wherein the microcontroller is configured to retrieve from the memory one of the switching conditions corresponding to a received AC input voltage status and output the control signals in accordance with the retrieved switching condition.

5. The power supply of claim 3, wherein the at least one detecting unit comprises a first detecting unit connected between the microcontroller and the first input and a second detecting unit connected between the microcontroller and the second input.

6. The power supply of claim 3, wherein the at least one transformer unit comprises a first transformer unit connected between the microcontroller and the first filtering and protection unit and a second transformer unit connected between the microcontroller and the second filtering and protection unit.

7. The power supply of claim 2, further comprising:
 a connector connected to an output of the rectifying and power conversion unit to output the DC output voltage; and
 an optocoupler connected between the control unit and the connector to provide signals between the control unit and the connector.

8. The power supply of claim 1, wherein the first filtering and protection unit and the second filtering and protection unit are composed of a same arrangement of components.

9. The power supply of claim 1, wherein the switching device comprises:
 a first solid state switching device connected to the first filtering and protection unit; and
 a second solid state switching device connected to the second filtering and protection unit.

10. The power supply of claim 1, wherein the rectifying and power conversion unit comprises a rectifier and an AC-DC power converter connected together.

11. A method for operating a dual-input single-output power supply, the method comprising:
 monitoring a first status of a first input feed at a first input of the power supply and a second status of a second input feed at a second input of the power supply;
 determining if at least one of the first status and the second status meets at least one switching condition; and
 outputting at least one control signal comprising instructions to cause a switching device connected to the first input and the second input to switch between the first input feed and the second input feed when the at least one switching condition is met.

12. The method of claim 11, further comprising:
 evaluating a switch back to a previous input feed after having switched between the first input feed and the second input feed by determining if at least one switch back condition has been met; and
 switching back to the previous input feed when the at least one switch back condition has been met.

13. The method of claim 12, wherein determining if at least one switch back condition has been met comprises determining if a time elapsed since switching meets a time threshold.

14. The method of claim 12, wherein determining if at least one switch back condition has been met comprises:
 determining if a present input feed corresponds to a designated primary feed; and
 switching back to the previous input feed when the present input feed is not the designated primary feed.

15. The method of claim 11, further comprising a start-up process comprising:
 determining a voltage level of the first input feed at the first input and the second input feed at the second input, and
 setting a mode of operation for the power supply as a function of the voltage level.

16. The method of claim 15, wherein setting a mode of operation comprises setting a first mode of operation for a voltage level of 120 Vac and setting a second mode of operation for a voltage level of 240 Vac.

17. The method of claim 11, further comprising retrieving the at least one switching condition from memory.

18. The method of claim 11, wherein the at least one switching condition comprises any one of:
 a lower voltage threshold;
 an upper voltage threshold;
 a lower frequency threshold;
 an upper frequency threshold; and
 a minimum time threshold.

19. The method of claim 11, wherein the at least one switching condition corresponds to one of a plurality of voltage settings available for the power supply.

20. A non-transitory computer readable medium having stored thereon program instructions for operating a dual-input single-output power supply, the program instructions executable by a processor for:
 monitoring a first status of a first input feed at a first input of the power supply and a second status of a second input feed at a second input of the power supply;
 determining if at least one of the first status and the second status meets at least one switching condition; and
 outputting at least one control signal comprising instructions to cause a switching device connected to the first input and the second input to switch between the first input feed and the second input feed when the at least one switching condition is met.

\* \* \* \* \*